United States Patent
Aramaki et al.

(10) Patent No.: US 7,710,455 B2
(45) Date of Patent: May 4, 2010

(54) NODE MANAGEMENT SYSTEM AND NODE MANAGING PROGRAM USING SENSING SYSTEM

(75) Inventors: Koji Aramaki, Tokyo (JP); Toshiyuki Aritsuka, Kodaira (JP); Yuichi Onami, Iruma (JP); Sumie Nakabayashi, Kokubunji (JP); Naoki Hashiguchi, Hamura (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 724 days.

(21) Appl. No.: 11/491,142

(22) Filed: Jul. 24, 2006

(65) Prior Publication Data

US 2007/0101382 A1    May 3, 2007

(30) Foreign Application Priority Data

Oct. 31, 2005   (JP)   ............................. 2005-315624

(51) Int. Cl.
- H04N 5/225 (2006.01)
- H04N 7/18 (2006.01)
- H04N 7/173 (2006.01)

(52) U.S. Cl. ..................... 348/207.1; 348/155; 725/105

(58) Field of Classification Search .............. 348/207.1, 348/211.1, 211.2, 211.3, 211.9, 143, 155, 348/211.4; 725/105

See application file for complete search history.

(56) References Cited

U.S. PATENT DOCUMENTS

| 6,509,715 | B1 * | 1/2003 | LaRue | 320/107 |
| 6,819,738 | B2 * | 11/2004 | Hoffman | 378/19 |
| 6,970,183 | B1 * | 11/2005 | Monroe | 348/143 |
| 7,207,014 | B2 * | 4/2007 | Velasco et al. | 716/1 |
| 7,406,401 | B2 * | 7/2008 | Ota et al. | 702/188 |
| 7,420,149 | B2 * | 9/2008 | Goldberg et al. | 250/208.1 |
| 2007/0052809 | A1 * | 3/2007 | Hammadou | 348/211.3 |

FOREIGN PATENT DOCUMENTS

JP    2003-115010    10/2001

* cited by examiner

Primary Examiner—Nhan T Tran
Assistant Examiner—Trung Diep
(74) Attorney, Agent, or Firm—Stites & Harbison PLLC; Juan Carlos A. Marquez, Esq.

(57) ABSTRACT

On the basis of state change information acquired by one of sensor nodes forming a sensor network, an instruction indicative of emitting a signal is issued to another node to acquire a photographed image from a camera. An image processing device identifies the ID and actual position of the node by issuing the signal issuance instruction to the node and detecting a signal obtained from the node from the photographed image. On the basis of personal information stored in a database, the image processing device detects a not-allowed action.

14 Claims, 12 Drawing Sheets

FIG.11

| TIME (H:M:S) | NAME CARD TYPE NODE ID | BASE STATION ID |
|---|---|---|
| 13:43:22 | 3d5f | 000a |
| 13:43:27 | 3d5f | 000a |
| 13:43:29 | 90d1 | 000b |
| 13:43:32 | 3d5f | 000a |
| 13:43:34 | 90d1 | 000b |
| 13:43:39 | 90d1 | 000b |
|  |  |  |

FIG.12

| STATE | CONDITIONS | PROCESSING CONTENTS |
|---|---|---|
| STEADY STATE | NODE 102B DETECTS ROOM ENTERING/LEAVING | SHIFT TO ROOM B ENTERING/LEAVING TIME IMAGING STATE |
| ROOM B ENTERING/ LEAVING TIME IMAGING STATE | IMMEDIATELY AFTER SHIFT FROM ANOTHER STATE | INSTRUCT CAMERA 131B TO HAVE PRESET P |
| | | INSTRUCT SPEAKER 172B TO SOUND "DURING AUTHENTICATION" |
| | | SHIFT TO LED RECOGNITION STATE OF ROOM B |
| LED RECOGNITION STATE OF ROOM B | IMMEDIATELY AFTER SHIFT FROM ANOTHER STATE | INSTRUCT IMAGE PROCESSING DEVICE 120 TO GENERATE STILL IMAGE |
| | | INSTRUCT IMAGE PROCESSING DEVICE 120 TO START RECOGNIZING LED TURNING-ON/OFF PATTERN |
| | | INSTRUCT BASE STATION 110B TO START LED TURNING-ON/OFF |
| | LED RECOGNITION SUCCEEDED | TEMPORARILY STORE TURNING-ON/OFF PATTERN NUMBER |
| | | SHIFT TO ROOM B ENTERING AUTHORITY CHECKING STATE |
| | LED RECOGNITION NOT SUCCEEDED | SHIFT TO PERSON-DIRECTION DETECTION STATE OF ROOM B |
| ROOM B ENTERING AUTHORITY CHECKING STATE | IMMEDIATELY AFTER SHIFT FROM ANOTHER STATE | CONVERT TURNING-ON/OFF PATTERN NUMBER TO NAME CARD TYPE NODE ID |
| | | TRANSMIT NAME CARD TYPE NODE ID TO APPLICATION CLIENT |
| | HAVING ROOM ENTERING AUTHORITY | SHIFT TO NORMAL ROOM B ENTERING PROCESSING STATE |
| | HAVING NO ROOM ENTERING AUTHORITY | SHIFT TO ROOM B-ENTERING UNAUTHORIZED-PERSON PROCESSING STATE |
| | | |

FIG.13

| | | 529 | | | |
|---|---|---|---|---|---|
| 520 521 | PERSON ID | 1234 | 1567 | 1890 | |
| 522 | PERSON NAME | YUKICHI FUKUZAWA | ICHIYO HIGUCHI | HIDEYO NOGUCHI | |
| 523 | AFFILIATION | PLANNING DEPT. | GENERAL AFFAIRS DEPT. | RESEARCH DEPT. | |
| 502 | NAME CARD TYPE NODE ID | 3d5f | 90d1 | 46a9 | |
| 525 | DOOR A ROOM ENTERING AUTHORITY | WITH | WITH | WITHOUT | |
| 525 | DOOR B ROOM ENTERING AUTHORITY | WITH | WITH | WITH | |
| 525 | DOCUMENT SHELF C USE AUTHORITY | WITH | WITHOUT | WITHOUT | |
| 525 | CHEMICAL STORAGE D USE AUTHORITY | WITHOUT | WITHOUT | WITH | |
| | | | | | |

NODE MANAGEMENT SYSTEM AND NODE MANAGING PROGRAM USING SENSING SYSTEM

INCORPORATION BY REFERENCE

The present application claims priority from Japanese application JP2005-315624 filed on Oct. 31, 2005, the content of which is hereby incorporated by reference into this application.

BACKGROUND OF THE INVENTION

The present invention relates to a sensing system using a wireless sensor network and a camera, a system for managing the entering/leaving of a place and the seating of a seat using the sensing system, and also a program for executing such systems.

For the purpose of managing the person entering or leaving of a place or detecting an abnormality, there is conventionally known a system which analyzes an image from a monitor camera installed at a predetermined position and realizes individual authentication or the like based on the image analysis. Also proposed to identify positions of a plurality of moving objects is a system which attaches a light emitting function or the like to the individual objects, analyzes images obtained by photographing the objects, and identifies IDs of the respective objects and their positions (for example, refer to JP-A-2003-115010).

SUMMARY OF THE INVENTION

There is a wireless sensor network which grasps and manages the state of a location by managing information received from a multiplicity of sensor nodes. However, when the wireless sensor nodes are distributed in a very wide range of space or when the nodes are located at positions such as ceiling or passage providing difficult mechanical contact, it becomes important to reduce troublesome labors of installing and maintaining these sensor nodes, and it is undesirable to burden the wireless sensor node sides with complex processing requirement, because the nodes are required to realize miniaturization and low power. Thus it is difficult to identify accurate positions of the individual sensor nodes. When the above position identification is carried out by detecting the presence or absence of radio communication between the sensor nodes and a base station or utilizing the wave intensity of the communication, only an approximate distance from the base station or only an approximate positional relation therewith can be estimated. For the purpose of identifying an accurate position between a terminal and a base station, it is generally common practice to combine information about wave arrival delays in the radio communication with a plurality of base stations and to use a torilateration principle. However, this method disadvantageously cannot obtain an accurate shortest distance under the multi-path influence, and thus the environment is required to satisfy specific conditions.

JP-A-2003-115010 discloses a system in which a light emitting member for emitting light in the form of a pattern unique to a given object is installed at the object in order to identify the position of the object, the emitted light pattern is photographed by a camera to acquire an image, and then the acquired image is processed. However, this system has a restriction that a function of automatically detecting the presence of a person at a predetermined known place and automatically identify the person cannot be realized, because the photographing is carried out at the timing that the user issues a position information request.

Meanwhile, for the purpose of managing the entering or leaving of a place or the like, a camera has been conventionally used. However, the use of the camera has a problem that an analysis result having a sufficiently high reliability cannot be always obtained due to the fluctuations of various photographing conditions caused by changes in the surrounding environment or in the appearance of the person.

An object of the present invention is therefore to provide a node management system and a node management program which can solve the problems in the related art.

Another object of the present invention is to provide a function of managing the entering/leaving of a place with a high reliability by operating a camera in cooperation with a sensor network to thereby complement defects in the sensor network and the camera.

The above objects are attained in the following manner as the summary of the present invention disclosed in the present application is explained. A node management system, which is connected to a camera and to one or more nodes, has a node managing section for managing the node, an image processing section for processing a photographed image, and a sequence control section for controlling the operation of the node managing section and the image processing section. When the node managing section detects the fact that information detected at a node satisfies predetermined conditions, the sequence control section issues an instruction to a second node to start issuing a signal on the basis of a sequence associated with the conditions, and acquires the image photographed by the camera. The image processing section analyzes a signal issued from the second node in the photographed image, identifies the ID of the node, and outputs the ID together with a position in the photographed image.

In accordance with the present invention, an accurate position of each of wireless sensor nodes can be identified on the basis of the camera image. As a result, the accurate position of each sensor node can be identified without using radio communication with a plurality of sensor network base stations or with other sensor nodes, while not affected by a distance measurement error caused by wireless multi-path.

Other objects, features and advantages of the invention will become apparent from the following description of the embodiments of the invention taken in conjunction with the accompanying drawings.

BRIEF DESCRIPTION OF THE DRAWINGS

FIG. 11 shows an ID notification historical list in the embodiment of the present invention;

FIG. 12 shows a rule table in the embodiment of the present invention; and

FIG. 13 shows a personal information table in the embodiment of the present invention.

DETAILED DESCRIPTION OF THE EMBODIMENTS

The invention disclosed in the present application will be explained in detail with reference to the accompanying drawings.

Figure 1:
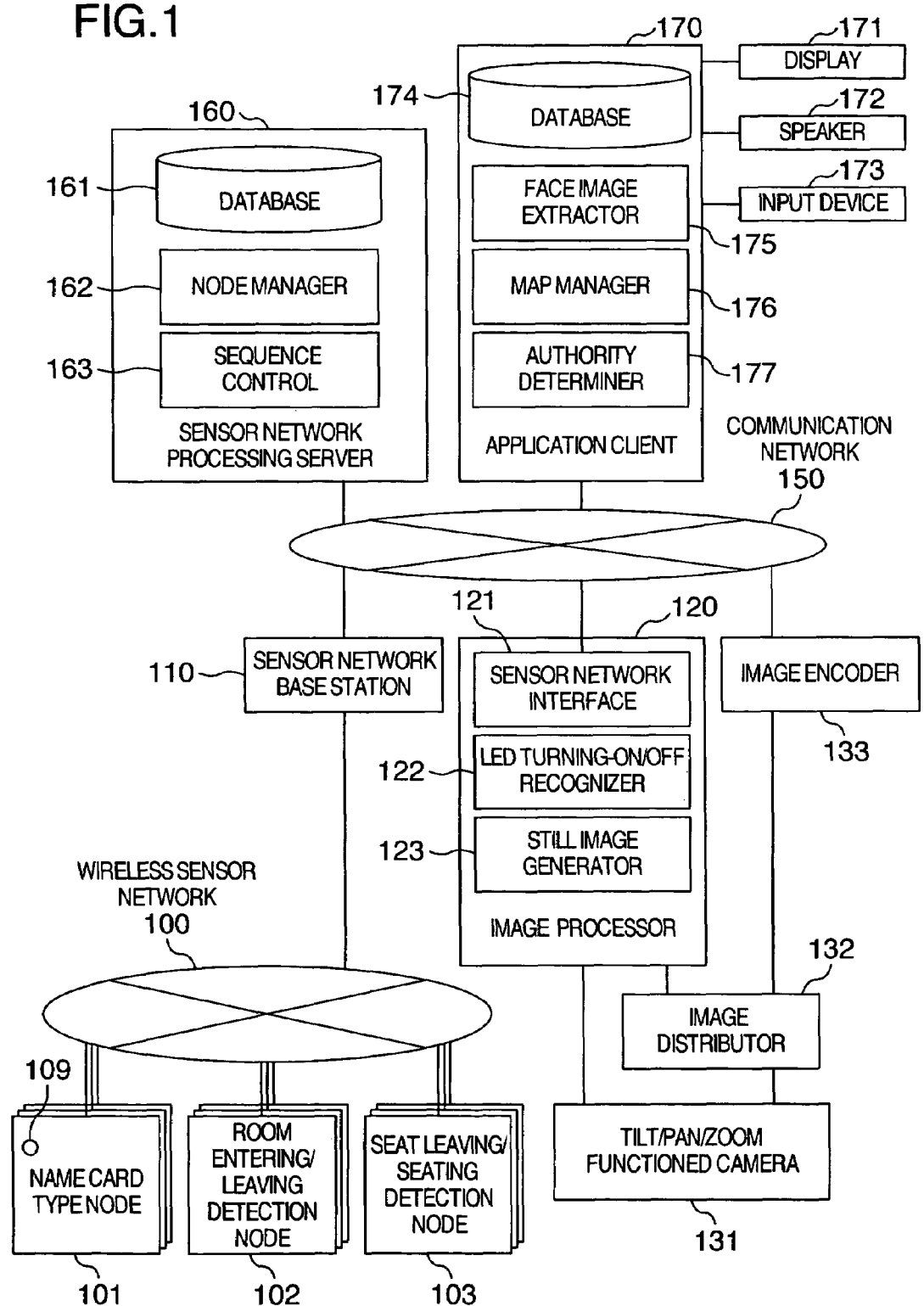
FIG. 1 shows a configuration of a sensor network system in accordance with an embodiment of the present invention.

FIG. 1 shows a configuration of a sensor network system in accordance with an embodiment of the present invention.

The system is directed, in a building such as an office building which many and unspecified persons visit, to detecting the presence of a person who enters or leaves a specific room in the building and identifying the person. Further, when such an action as not to be allowed to the person is taken, the system is intended, for example, to detect the fact and as necessary, to record or display the detected contents or to inform a security authorized person or guard of the detected contents. In the following description, a specific section for the person to enter or leave will be called "room", hereinafter. However, the room is not limited to such a section physically defined by walls or the like. The actions of the person who enters or leave the specific section will be referred to as room entering or room leaving, hereinafter.

An office building has one or more wireless sensor networks 100. Each wireless sensor network 100 is connected to one or more sensor network base stations 110. The network 100 is also connected to at least any one or more of a name card type node 101, a room entering/leaving detection node 102, and a seat leaving/seating detection node 103.

The room entering/leaving detection node 102 is a sensor node, for example, connected to a switch mounted to a door. The node 102 detects the person entering or leaving a room by detecting a change from the closed state of the door to the opened state or vice versa. Or as the room entering/leaving detection node 102, a foot-operated switch provided under a mat may be used. The seat leaving/seating detection node 103 is, for example, a sensor node connected to a switch mounted under the sitting surface of a chair. The node 103 detects a person's seat leaving or seating by detecting a change in a load applied to the sitting surface. In other words, the name card type node 101 and the seat leaving/seating detection node 103 in the present embodiment are nodes for detecting a specific position in an office building or a change in the state of a small section in the building. In the present embodiment, the above two types of nodes are employed as a specific example. However, any sensor node can be applied to the system as a sensor node for detecting a state change to start a sequence, so long as the node can sense a predetermined state change. Meanwhile, the name card type node 101 is a sensor node which is intended to be always carried by each of individual persons who enters or leaves the building. Thus the position of the name card type node is not fixed and accompanied by the position of the card holder. As a result, the sensor network base station 110 capable of communicating directly with the name card type node 101 varies together with the position of the holder of the name card type node. In the present invention, in this way, the processing is shared roughly, by the base station having a fixed position, the sensor node for detecting predetermined conditions, and the mobile node moving together with its holder person. And a monitoring function with a high reliability and a high response performance can be realized by combining these shared processings according to a predetermined rule. In this connection, unique IDs are allocated to all devices contributing to communication, and upon communication, the ID of a transmission originator or source is transmitted to a reception destination. The sensor node for detecting a state change to start a sequence is not limited to the aforementioned example, but any sensor node may be employed, so long as the node for emitting a predetermined signal is previously linked to a location to be monitored in the sequence with respect to sensing data. If the sensor node can detect a predetermined state change, such a movable node as a name card type node may be employed.

Figure 8A:
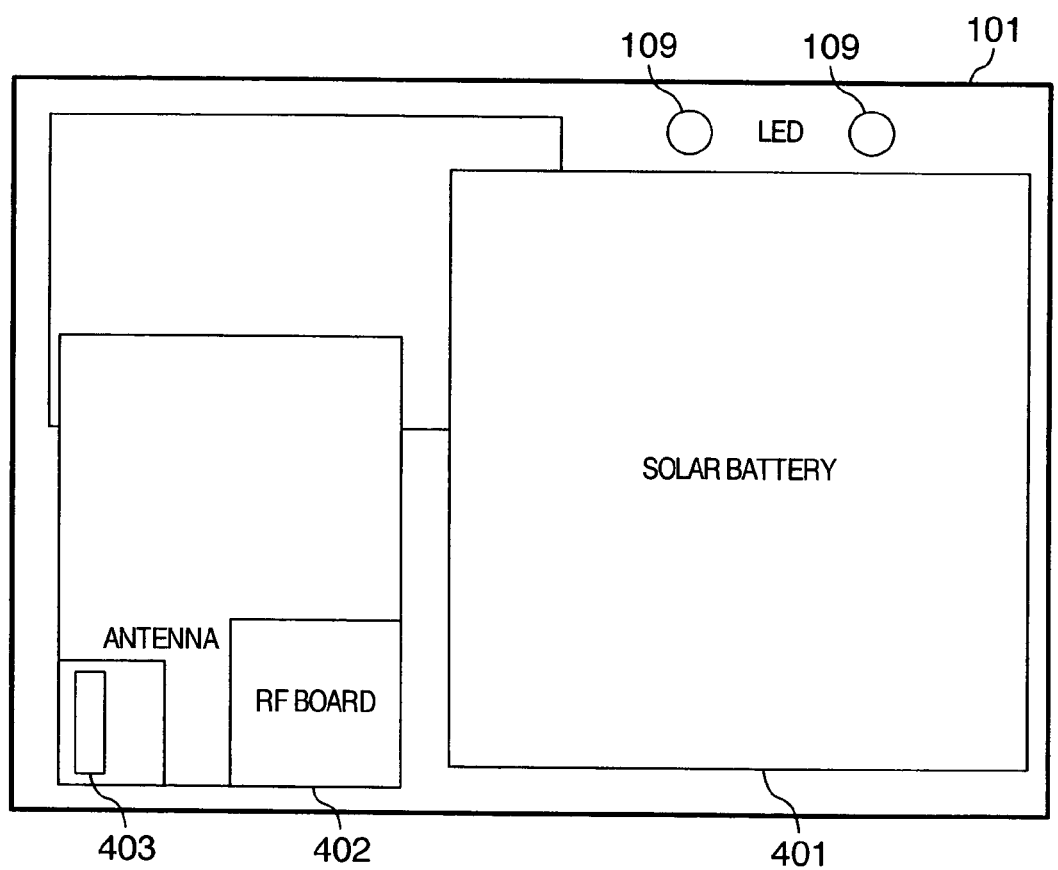
FIG. 8A is a front view of a name card type node in the embodiment of the present invention.

An example of the physical arrangement of the sensor node will be explained by referring to FIGS. 8A and 8B. FIG. 8A is a front view of the name card type node 101 in an embodiment of the present invention. In the front side of the name card type node 101; an LED 109, a solar battery 401, an RF board 402, and an antenna 403 are installed.

Figure 8B:
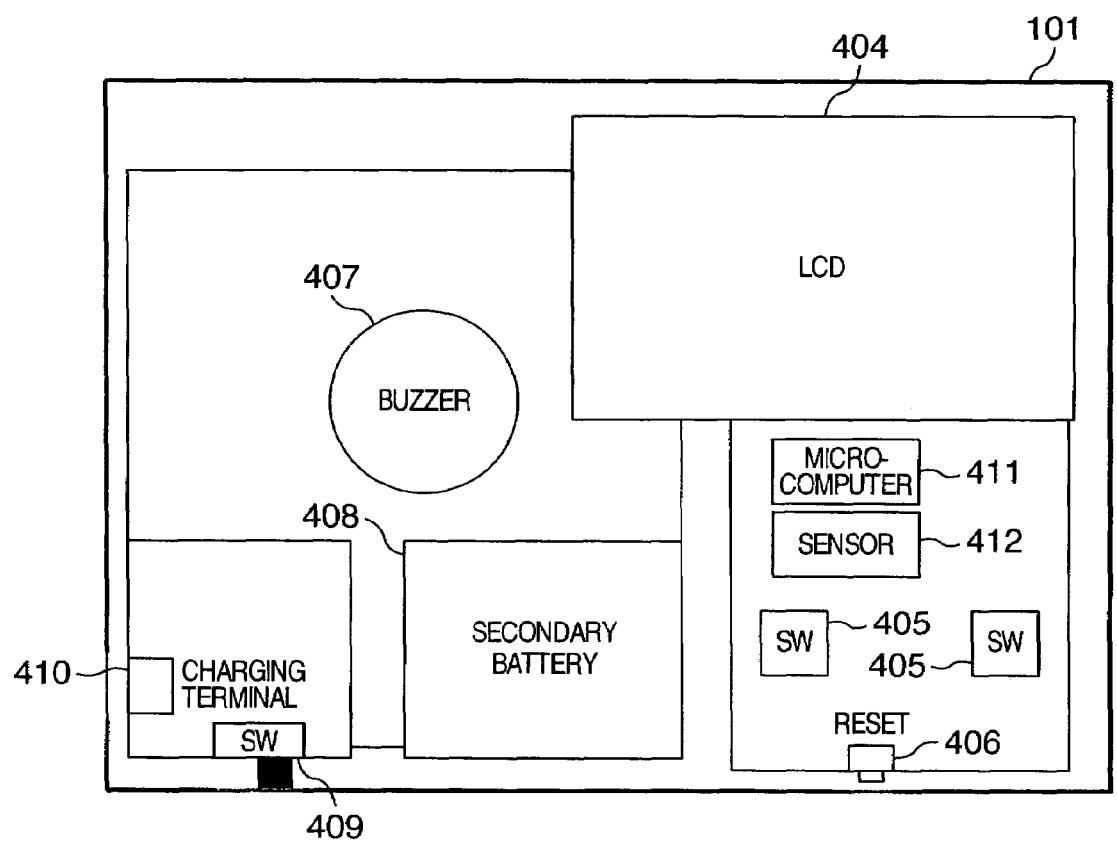
FIG. 8B is a rear view of the name card type node in the embodiment of the present invention.
Figure 9A:
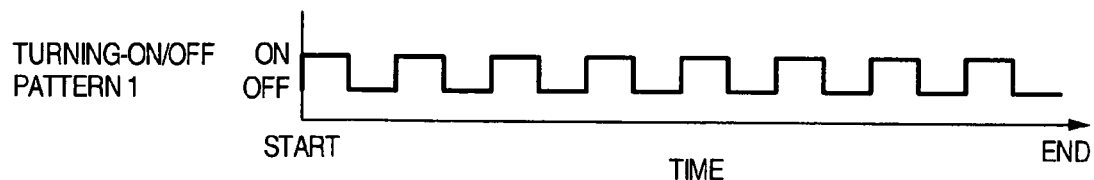
FIGS. 9A to 9D show a timing chart of LED turning-on/off in the embodiment of the present invention.
Figure 9B:
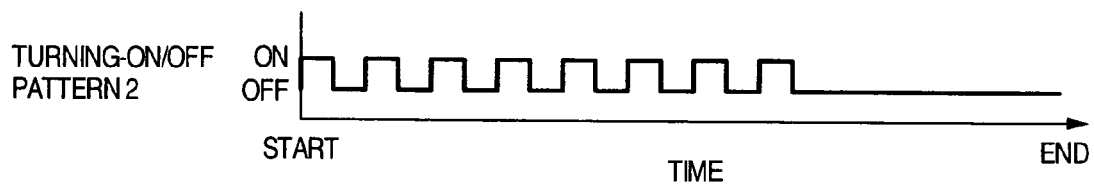
Figure 9C:
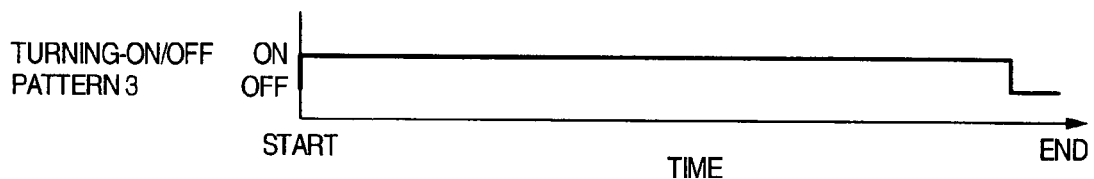
Figure 9D:
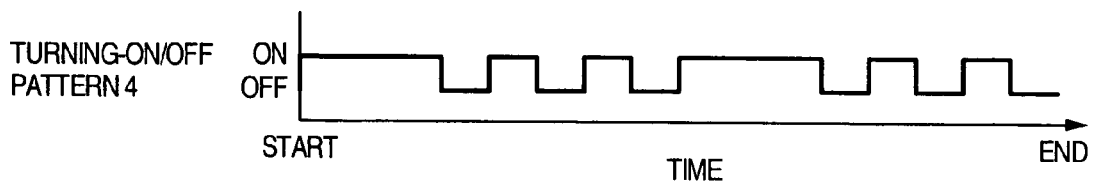

FIG. 8B is a rear view of the name card type node 101 in the embodiment of the present invention. Disposed in the rear side of the name card type node 101 are an LCD 404, an operation switch 405, a reset switch 406, a buzzer 407, a secondary battery 408, a power source switch 409, a charging terminal 410, a microcomputer 411, and a sensor 412. The solar battery 401 generates an electricity by extracting electric power from sunlight. The name card type node 101 may be provided with a device for generating electricity in another manner in place of the solar battery 401.

A circuit for radio communication is mounted on the RF board 402. And the RF board 402 wirelessly communicates with the base station 110 via the antenna 403. The LCD 404 is a liquid crystal display for displaying various sorts of information. The name card type node 101 may be provided with another display in place of the LCD 404.

The operation switch 405 is a switch operated by the user. The user enters various sorts of information into the name card type node 101 by operating the operation switch 405. When the reset switch 406 is operated by the user, this resets the name card type node 101. The buzzer 407, when satisfying predetermined conditions, issues a sound. The buzzer 407 issues a sound, for example, when the name card type node 101 receives information from a sensor network processing server 160. With it, the buzzer 407 can inform the user of the information reception.

The secondary battery 408 supplies power to the name card type node 101. The secondary battery 408 is, for example, a lithium ion battery. Since the lithium ion battery has a large capacity per unit volume and has no memory effect upon charging, the lithium ion battery is most suitable as the secondary battery 408. The power source switch 409 switches between on and off states of the power of the name card type node 101. The charging terminal 410, when connected to an external power source, charges the secondary battery 408. The microcomputer 411 controls the entire name card type node 101. The microcomputer 411 is activated at intervals of predetermined time, e.g., 5 seconds. Otherwise, the microcomputer is put in a sleep state, suppressing power consumption. The microcomputer 411 measures various sorts of information at the sensor 412 at intervals of a predetermined time, transmits the measured value to the base station 110 together with its own ID, and receives an instruction from the base station. When the instruction transmitted from the base station 110 is to start the turning-on/off of the LED, the microcomputer 411 causes the LED 109 to emit light in the form of a predetermined turning-on/off pattern. The sensor 412 measures various sorts of information including temperature, humidity, and acceleration. All the sensor network base stations 110 are connected to a communication network 150. Also connected to the communication network 150 are a sensor network processing server 160 and an application client 170.

The sensor network processing server 160 is a computer which includes a database 161, a node managing section 162, and a sequence control section 163. Connected to the database 161 are an ID notification historical list 500 to be explained in FIG. 10 and a rule table 510 to be explained in FIG. 12. The node managing section 162 performs operations including processing and recording the sensed data transmitted from the name card type node 101, the room entering/leaving detection node 102, and the seat leaving/seating detection node 103. The node managing section 162 also manages the positions of the nodes and, in particular, monitors an increase or decrease in the number of name card type nodes 101 belonging to each base station 110. The sequence control section 163 controls the flow of processing operation of the entire system according to the contents of the rule table 510.

The application client 170 is a computer which includes a database 174, a face image extraction unit 175, a map managing unit 176, and an authority determining unit 177. The application client 170 is connected with a display device 171, a speaker 172, and an input device 173. The application client realizes a user interface function.

Stored in the database 174 is a personal information table 520 (see FIG. 13) which includes personal names corresponding to the IDs of the name card type nodes 101 and entering-room authority information.

The face image extraction unit 175 can analyze still image data, and can extract an image of unspecified person's face and an image of a small section in the vicinity thereof from the still image data. In the following explanation, the above extracted result will be referred to as 'face image'. Information about the direction of the person can also be obtained from the extracted result. That is, When the extraction is successful, the information includes its front view; while, when the extraction is unsuccessful, the information includes its rear view.

The map managing unit 176 manages data on a passage map to be displayed on the display device.

The authority determining unit 177 determines the presence or absence of the authority about a specific action of the specific person on the basis of information stored in the personal information table 520 to be explained in FIG. 13.

When each sensor network base station sequentially transmits the ID of the name card type node 101 communicatable with the sensor network base station to the sensor network processing server 160, the position of the name card type node 101 can be held in the sensor network processing server 160 in units of the sensor network base station. When information on the position of the name card type node 101 is transmitted from the server 160 to the application client 170, the position of the person who carries the name card type node 101 can be displayed on the display device 171, for example, in the form of a person icon on the passage map.

The communication network 150 is connected with an image processing device 120. The image processing device 120 which includes a sensor network interface 121 for communication with the sensor network processing server 160. Thus the image processing device 120 can also be treated as a sort of the base station 110.

The image processing device 120 is connected with a camera 131 and an image distributor 132. The camera 131 has a tilt/pan/zoom function. The image processing device 120 can transmit various sorts of instructions to the camera 131 to change a viewing angle or a zoom ratio. A signal indicative of an image photographed by the camera 131 is distributed by the image distributor 132. The image distributor 132 always transmits the image signal to the image processing device 120 and an image encoder 133.

The image signal inputted to the image encoder 133 is compressed and encoded into digital image stream data, which in turn is transmitted to the application client 170 via the communication network 150. As a result, the image taken by the camera 131 can be displayed on the display device 171 with substantially no delay.

The image processing device 120 has a still image generation unit 123. When the image processing device 120 receives an instruction indicative of generation of a still image transmitted from the sensor network processing server 160, the still image generation unit 123 generates still image data on the basis of the image signal inputted from the image distributor 132, and transmits the still image data to the application client 170. The aforementioned digital image stream data is, in many cases, deteriorated in picture quality in the course of the compression and conversion. Since this function enables generation of an original quality level of still image data, however, the data can be supplied as input data suitable for face image extraction in an LED recognition state 302 to be explained in FIG. 3.

The image processing device 120 also has an LED turning-on/off recognition unit 122. The LED turning-on/off recognition unit 122 analyzes an LED turning-on/off pattern in the image inputted from the image distributor 132 in a time series manner, compares it with a plurality of turning-on/off patterns previously defined, and identified the turning-on/off pattern. The name card type node 101 has the LED 109. When the name card type node 101 receives an instruction indicative of start of LED turning-on/off transmitted from the sensor network base station 110, the LED 109 emits light in the form of a predetermined turning-on/off pattern. The turning-on/off pattern may be defined as a pattern unique to the ID of the name card type node 101, or may be dynamically defined by the sensor network processing server 160 as necessary and then transmitted to the name card type node 101. A correspondence relation between the turning-on/off pattern and the ID of the name card type node 101 may be previously stored even in the image processing device 120, or may be dynamically transmitted from the sensor network processing server 160. As a result, the LED turning-on/off recognition unit 122 can identify the ID of the photographed name card type node. In this connection, the LED 109 is usually put in the off state and when necessary, turned on/off. Thus, when compared with when the LED is always turned on/off, the power consumption of the name card type node 101 advantageously can be suppressed, and a frequency of requiring the user to charge the name card type node 101 can be reduced.

More specifically, the room entering/leaving detection node 102 or the seat leaving/seating detection node 103 is usually put in a power off state or the microcomputer is put in a sleep state thereof. However, when the switch detects the opened or closed state of the door or a seat leaving or seating or when the sensor senses and finds a satisfaction of preset conditions, this causes the power of such card nodes to be turned on or the microcomputer to be shifted immediately to its operative state. And after operations necessary for the sensing, radio communication, etc. have been completed; the card node power is again turned off or the microcomputer thereof is returned to the sleep state. As a result, the power consumption of each node advantageously can be suppressed and a frequency of requiring the user to change the card node can be reduced. A great advantage of the sensor network is to operate a multiplicity of nodes in cooperation with each other, collect spatially dense information, and obtain significant information. Accordingly, it is an important factor of producing an effect of remarkably reducing the operating cost of the entire sensor network system that can reduce a frequency of charging many sensor nodes. Thus the arrangement of this application has a merit capable of reducing the power of each node. When compared with a method for performing periodical sensing operation and radio communication based on a timer, the system of the invention executes a series of operations associated with the sensing operation quickly cooperatively when a change occurs in the monitor target object. Thus, a time required after the sensed information is transmitted to the base station until the information is processed, is short. In particular, it is a great advantage in the sensor network that the action of the user in everyday life such as opening/closing a door or leaving a seat or sitting on the seat can be grasped while not requiring the user to make a specific action. Thus quick operation can be realized in the system, which is very important.

The sensor network processing server 160, the application client 170, and the image processing device 120 may be realized in the same apparatus. The processing operations of these server, client and device may be executed by a computer which reads a program therein, or may be realized by cooperative operation with hardware.

Figure 2:
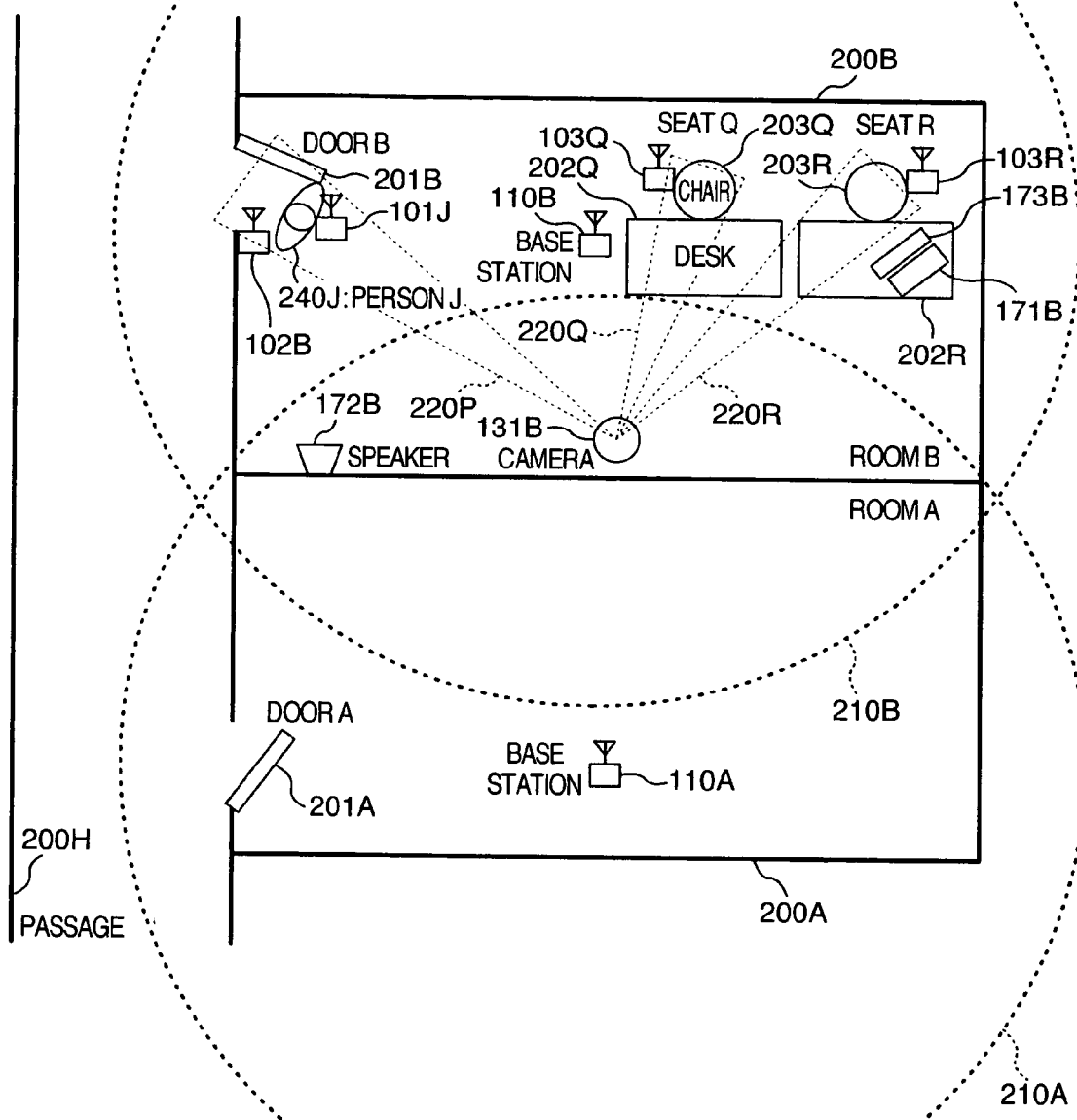
FIG. 2 is a diagram for explaining when the sensor network system of the embodiment of the invention is installed.

FIG. 2 is a diagram for explaining a case where the sensor network system of the embodiment of the present invention is installed.

In the present embodiment, adjacent rooms A (220A) and B (200B) in an office building are adjacent to a passage 200H. The user can leave the room A through a door A (201A) and go to the passage 200H, and vice versa. The user can similarly leave the room B through a door B (201B) and go to the passage B, and vice versa.

There are seats Q and R in the room B, the seat Q is made up of a desk 202Q and a chair 203Q, and the seat R is made up of a desk 202R and a chair 203R. Seat leaving/seating detection nodes 103Q and 103R are installed at the chairs 203Q and 203R respectively, so that, when an unspecified person sits on each chair or rises up from the chair, the node provided in the chair can detect the fact.

A camera 131A, which is installed on the ceiling or on an upper wall in the room B, periodically takes a picture of the entire room B usually through its surveillance operation. A plurality of pieces of preset information about predetermined tilt and pan angles are stored in the camera 131B. In addition, a zoom ratio may be set therein. When a preset P of these information is used, the camera 131A is directed in such a direction as shown by a dotted line 220P in FIG. 2, so that the camera can take a picture of the appearance of the person who leaves or enters the room through the door B. Similarly, when presets Q and R are used, the camera 131B is directed in directions shown by dotted lines 220Q and 220R respectively, so that the camera can take pictures of persons who are located in the seats Q and R.

The door B is provided with a room entering/leaving detection node 102B, which can detect the opening or closing operation of the door and can detect the fact that the unspecified person entered or left the room.

A speaker 172B is installed in the interior of the room B, so that the speaker can issue voice data outputted from the application client 170 by voice. An input device 173B is installed on the desk 202R which plays a role of a user interface. Further, a base station 110B is installed in the room B, and has such a radio communicatable range as shown by a dotted line 210B. Since the base station can wirelessly communicate with all the sensor nodes within the room B, these nodes can make up the wireless sensor network 100.

In the example of FIG. 2, a person J (240J) carries a name card type node 101J and facing the camera 131B with the door B open. The camera 131B is installed at such a position that the camera can take a front-view picture of the person entering the room through the door. The node is held at such a position that the camera can take pictures of the person's face and the LED 109 at the same time. For example, the name card type node 101 is held on the person in the vicinity of his chest by use of a strap depending from his neck or by use of a clip or the like for holding the card node in his chest pocket.

Figure 3:
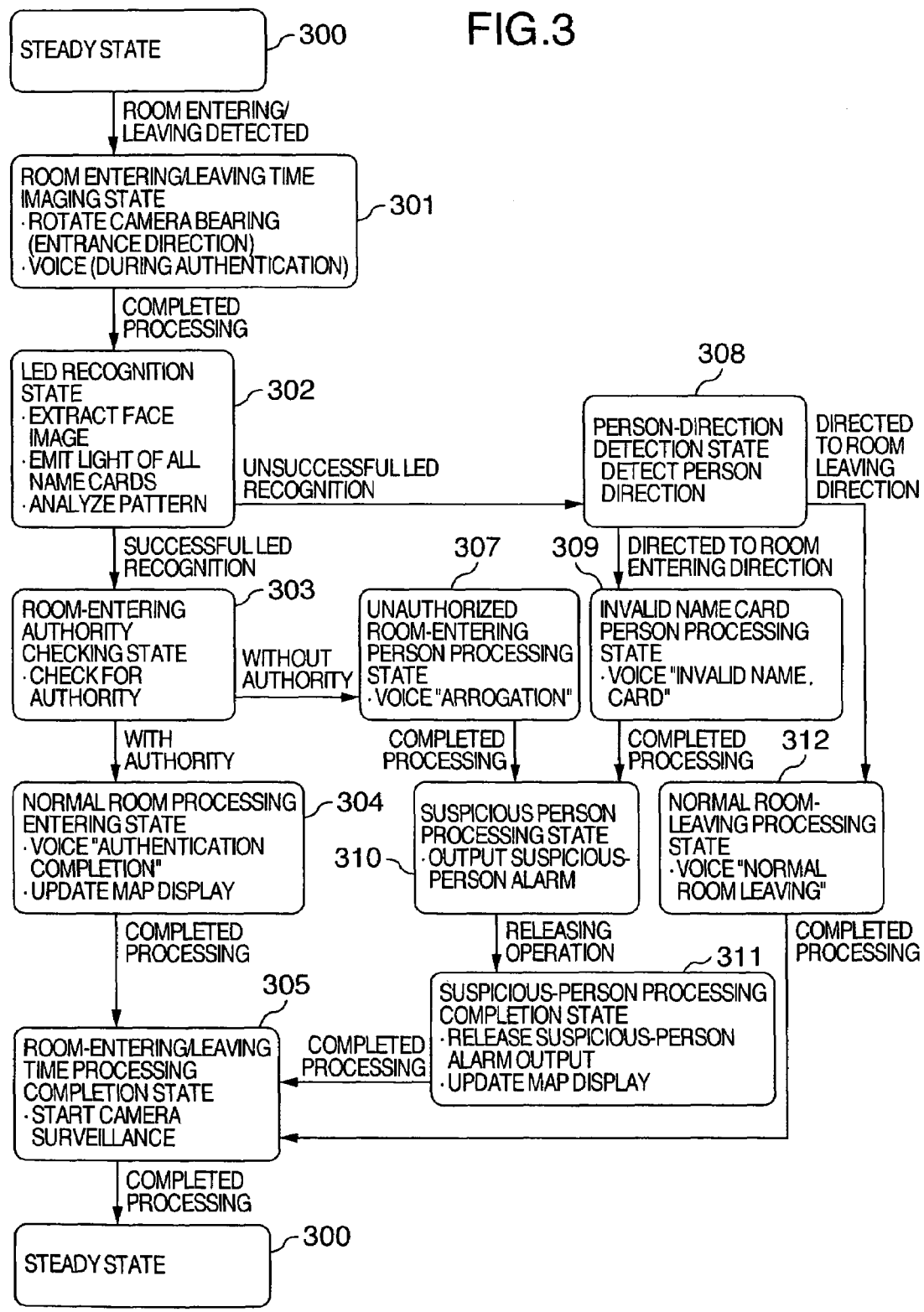
FIG. 3 is an automaton diagram when a room entering or leaving is detected in the embodiment of the present invention.

FIG. 3 is an automaton diagram showing the behavior of the entire system when the room entering/leaving detection node 102B provided at the door B in FIG. 2 detects a room entering or leaving action.

In a steady state 300, the camera 131B periodically takes a picture of the entire room B through its predetermined surveillance operation. When the room entering/leaving detection node 102B detects a room entering or leaving action, the node 102B transmits the detected fact from the node 102B to the sensor network processing server 160 via the wireless sensor network 100, the sensor network base station 110, and the communication network 150. When the sensor network processing server 160 receives the detected fact, the sequence control section 163 searches the rule table 510 for a rule 519A conforming to the exemplified state 511 and conditions 512.

Figure 7:
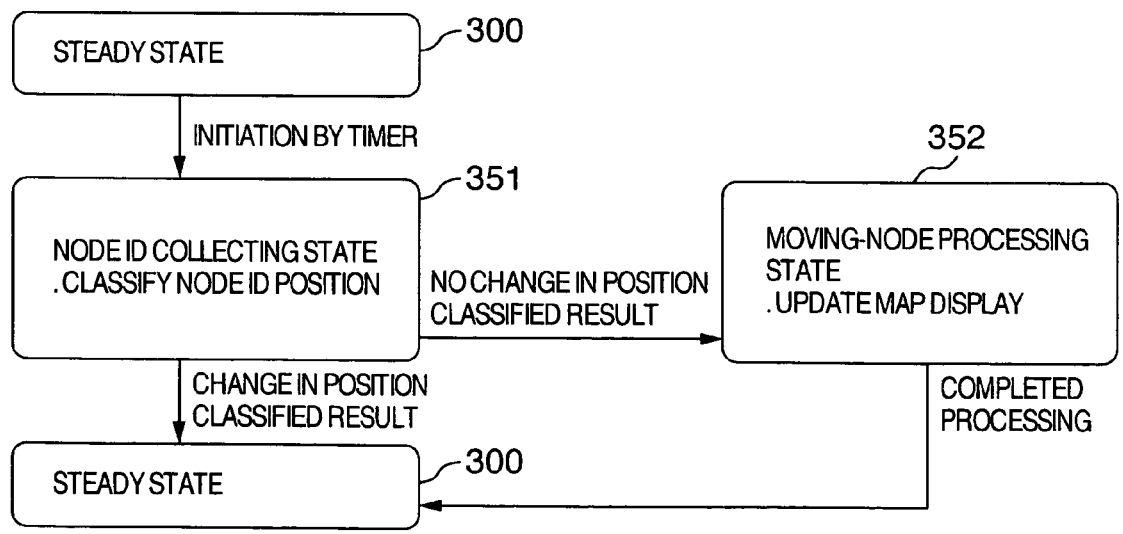
FIG. 7 is an automaton diagram of an ID amounting process in the embodiment of the present invention.

FIG. 12 shows an example of the rule table 510 stored in the database 161. The rule table 510 is a set of rules 519 showing a sequence control procedure. In this application, a series of processing operations to be taken are linked to state changes detected from the sensor nodes as a series of triggers. Each rule table 510 is previously stored. A set of rules 519 includes a state 511, a condition 512, and processing contents 513. As a general structure, more in detail, with respect to information (e.g., the condition 512 of a rule 519A) detected from a predetermined node; a node for processing to be started, its processing contents, and the processing contents 513 including set information about camera imaging angle, etc. and operations; are defined in a time series manner. The sequence control section 163 searches the rule table 510 for the corresponding rule 519 on the basis of the current state and conditions, and executes its processing contents 513. The processing contents 513 may be divided into a plurality of small items. On the basis of the rule 519, each of the operations explained in FIGS. 3 and 7 is executed. The processing contents 513 of the rule 519A is to transit to an imaging state 301 upon entering/leaving the room (which state will be referred to as the "room entering/leaving time imaging state 301", hereinafter). This transition is executed by the sequence control section 163. In this way, the sequence control section 163 receives information indicative of a state change, searches and executes the processing operation based on the new state, whereby the processing operation of the entire system is automatically advanced. In other words, in accordance with the present invention, the use of information acquired from sensors singly or in combination enables identification of the situation while eliminating the need for active operation of the monitoring person. Thus a suitable viewing angle or a suitable zoom ratio can be allocated to the camera according to the situation. As a result, since the system can sense a state change in the blind spot of the camera on a real-time basis and a sequence necessary for camera imaging or photographing or the like can be quickly started, the system can suppress the risk of missing an abnormality or erroneous judgment based on the misunderstanding of the monitoring person.

In the following explanation, the explanation of searching and processing execution of the sequence control section 163 will be omitted.

In an imaging state 301 upon entering/leaving the room (which state will be referred to as the room entering/leaving time imaging state 301, hereinafter), the server 160 first instructs the camera 131B to apply the preset P via the image processing device 120 as shown in a rule 519B. The server 160 also transmits the fact that a room entering or leaving was detected by the room entering/leaving detection node 102B to the application client 170. The server may issue an instruction to sound a voice message saying 'under authentication' from the speaker 172. After the operations are completed, the system is transited to the LED recognition state 302.

In the LED recognition state 302, the server 160 first transmits an instruction indicative of creation of a still image to the image processing device 120. In response to it, the still image generation unit 123 creates still image data and transmits the still data to the application client 170. Based on the received still image data, the face image extraction unit 175 extracts a face image. The server 160 transmits an instruction to the image processing device 120 to cause the image processing device 120 to start recognizing the LED turning-on/off pattern. At the same time, the sensor network processing server 160 transmits an instruction to the sensor network base station 110B provided in the vicinity of the door B where the room entering/leaving was detected and capable of communicating directly with the server to cause the base station to start flashing the LED. In response to it, the base station 110B transmits an instruction to all the name card type nodes 101 belonging to the base station to cause the nodes to start flashing the LED. As a result, each of the name card type nodes 101 belonging to the base station 110B emits light from its own LED 109 in the form of a turning-on/off pattern allocated to its own. Details of the turning-on/off pattern will be explained in FIGS. 9A to 9D. At this time, since the preset P is applied to the camera 131B, it is one 101J of the name card type nodes 101 held by a person 240J who entered the room, that is photographed by the camera 131B. A recognition result obtained by the LED turning-on/off recognition unit 122 is transmitted to the server 160 in the form of information indicative of successful or unsuccessful recognition. In the successful recognition, a number indicative of the recognized turning-on/off pattern is included in the recognition result. In the successful recognition, the server shifts to a room-entering authority checking state 303. Whereas, in the unsuccessful recognition, the server shifts to a person-direction detection state 308. In accordance with the present invention, in this way, the sensing operation of the sensor network and the analysis of the camera image can be cooperated with each other in various manners. As a result, such information as hardly available by the sensor network alone or by the camera image alone can be quickly offered.

In the room-entering authority checking state 303, the sensor network processing server 160 converts the number indicative of the recognized turning-on/off pattern to a name card type node ID 502. The name card type node ID 502 is transmitted from the server 160 to the application client 170. When receiving the name card type node ID 502, the authority determining unit 177 searches the personal information management table 520 stored in the database 174 on the basis of the name card type node ID 502, and finds a set of personal information 529.

FIG. 13 shows an example of the personal information table 520 stored in the database 174. The personal information table 520 is a group of the personal information sets 529. A set of the personal information 529 corresponds to one person; and includes a person ID 521, a person name 522, an affiliation 523, a name card type node ID 502, and an authority presence/absence 525. Since the authority presence/absence 525 is provided each action, a plurality of the authority presence/absence 525 may be provided. Each piece of personal information 529 is previously stored. The authority determining unit 177 determines the presence or absence of the room entering authority on the basis of the authority presence/absence 525 relating to the person ID 521 and to each action, and transmits its determined result to the server 160. Thereafter, in the presence of the room entering authority, the server shifts to a normal room entering state 304. Whereas, in the absence of the room entering authority, the server shifts to an unauthorized room-entering person processing state 307.

In the normal room entering state 304, the server 160 instructs the application client 170 to display the fact of completion of the recognition. In response to it, the map managing unit 176 adds the personal information 529 and the face image searched in the room-entering authority checking state 303 on a passage map as room-staying person information, and updates the display on the display device 171. The server 160 also may issue an instruction to the application client 170 to sound a voice message saying the completion of the recognition from the speaker 172. When these operations are completed, the fact of completion of the normal room entering operation is transmitted from the application client 170 to the server 160. Thus the server shifts to a processing completion state 305 upon entering/leaving the room (which state will be referred to as the "room-entering/leaving time processing completion state 305", hereinafter).

In the room-entering/leaving time processing completion state 305, the server 160 instructs the camera 131B via the image processing device 120 to resume the normal surveillance operation. Thereafter, the server shifts to the steady state 300.

In an unauthorized room-entering person processing state 307, the server 160 instructs the application client 170 to display the fact of no room-entering authority. In response to it, the map managing unit 176 updates the display on the display device 171. The server 160 may instruct the application client 170 to sound a voice message saying no room-entering authority from the speaker 172. After the unauthorized room-entering person processing state 307, the server shifts to a suspicious person processing state 310.

In the person-direction detection state 308, the server 160 instructs the application client 170 to perform person-direction detecting operation. The application client 170 determines whether the person points in his room entering or leaving direction on the basis of information about person direction obtained as a result of the face image extraction in the LED recognition state 302, and transmits the determined result to the server 160. When the person points in the room entering direction, the server shifts to an invalid name card person processing state 309; whereas, when the person points in the room leaving direction, the server shifts to a normal room-leaving processing state 312.

In the invalid name card person processing state 309, the server 160 instructs the application client 170 to display the fact of the invalid name card. In response to it, the map managing unit 176 updates the display on the display device 171. The server 160 may instruct the application client 170 to cause the speaker 172 to sound a voice message saying the invalid name card. After the invalid name card person processing state 309, the server shifts to the suspicious person processing state 310.

In the suspicious person processing state 310, the server 160 instructs the application client 170 to issue a suspicious person alarm. In response to it, the application client 170 instructs the speaker 172 to start issuing a voice message saying the fact that the suspicious person is entering the room, and also instructs the display device 171 to display the face image obtained in the LED recognition state 302 and an alarm message thereon. When the user releases the current state by depressing a specific key on the input device 173 or the like, this causes the fact of the released state to be transmitted from the application client 170 to the server 160, with the result that the server shifts to a suspicious-person processing completion state 311.

In the suspicious-person processing completion state 311, the server 160 instructs the application client 170 to release the output of the suspicious person alarm. In response to it, the application client 170 stops the output of the voice message generated and started in the suspicious person processing state 310, and displays the normal passage map on the display device 171. After these operations have been completed, the fact of completion of the suspicious-person processing operation is transmitted from the application client 170 to the server 160, thus shifting the server to the room-entering/leaving time processing completion state 305.

In the normal room-leaving processing state 312, the server 160 instructs the application client 170 to display a message saying that the suspicious person normally left the room. In response to it, the map managing unit 176 updates the display on the display device 171. The server 160 may instruct the application client 170 to cause the speaker 172 to sound a voice message saying that the person normally left the room. The fact of completion of the post-operation after the suspicious person normally left the room is transmitted from the application client 170 to the server 160, thus shifting the server to the room-entering/leaving time processing completion state 305.

Figure 4:
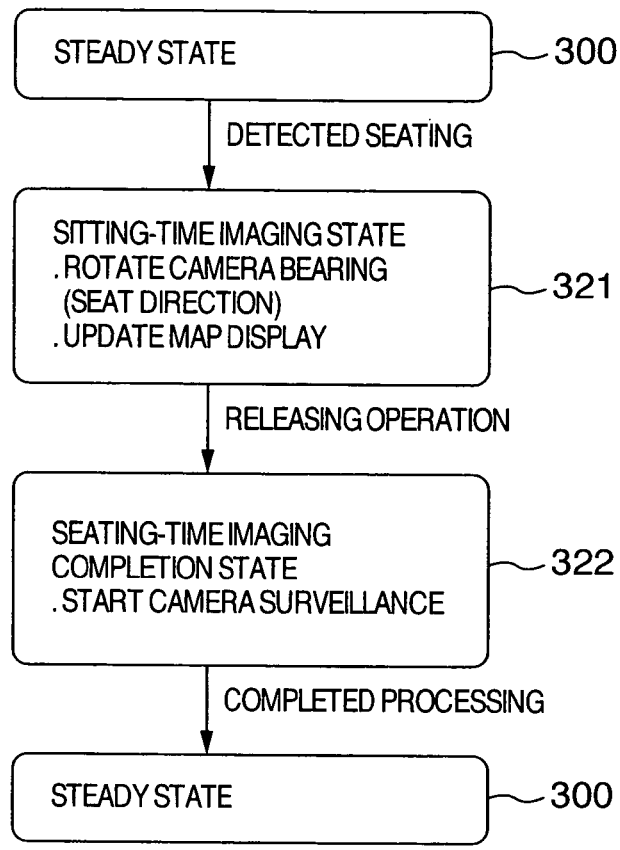
FIG. 4 is an automaton diagram when a seating is detected in the embodiment of the present invention.

FIG. 4 is an automaton diagram showing the behavior of the entire system when the seat leaving/seating detection node 103 for the seat Q or R in FIG. 2 detects that a person sat on the seat. In the following explanation, it is assumed that the person sat on the seat Q.

When the seat leaving/seating detection node 103Q detects the person sitting on the seat in the steady state 300, The detected fact is transmitted from the room entering/leaving detection node 102B to the sensor network processing server 160, with the result that the server shifts to a sitting-time imaging state 321.

In the sitting-time imaging state 321, the server 160 instructs the camera 131B via the image processing device 120 to apply a preset Q thereto. The server 160 also transmits the fact that the person sat on the seat Q to the application client 170. In response to it, the map managing unit 176 changes an icon indicative of the seat leaving/seating state at a position of the seat Q on the passage map to its sat seat state, and updates the display on the display device 171. When the user releases the current state, for example, by depressing a specific key on the input device 173, the fact of the released state is transmitted from the application client 170 to the server 160, resulting in that the server shifts to a seating-time imaging completion state 322.

In the seating-time imaging completion state 322, the server 160 instructs the camera 131B via the image processing device 120 to resume the normal surveillance operation. Thereafter, the server shifts to the steady state 300.

The specific sequence when the sitting or seating is detected has been exemplified. However, as in the case of the room entering/leaving detection explained in FIG. 3, after the sitting-time imaging state 321 and subsequent states; the LED may be turned on/off, the turning-on/off pattern may be image-analyzed, the seated person may be identified, the person may be displayed on the display device 171, the authority of the person relating to the seating action may be determined, or an alarm may be issued as necessary.

Figure 5:
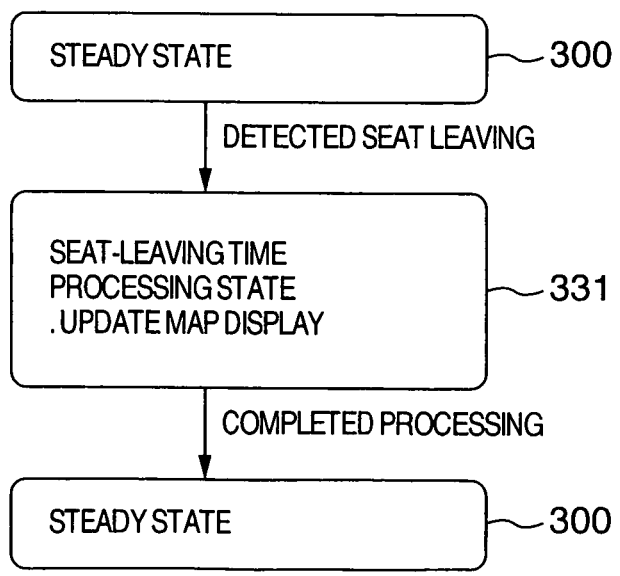
FIG. 5 is an automaton diagram when a seat leaving is detected in the embodiment of the present invention.

FIG. 5 is an automaton diagram showing the behavior of the entire system when the seat leaving/seating detection node 103 for the seat Q or R in FIG. 2 detects a seat leaving state. In the following explanation, it is assumed that the detection was found in the seat Q.

When the seat leaving/seating detection node 103Q detects the seated person in the steady state 300, the detection is transmitted from the room entering/leaving detection node 102B to the sensor network processing server 160, whereby the server shifts to a seat-leaving time processing state 331.

Figure 6:
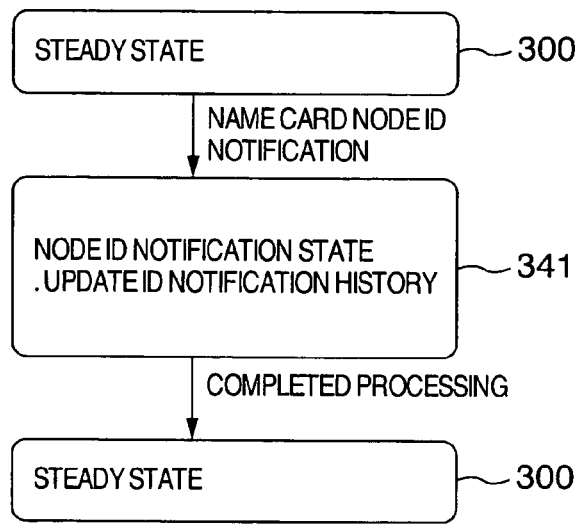
FIG. 6 is an automaton diagram of a name card type node ID notification process in the embodiment of the present invention.

In the seat-leaving time processing state 331, the server 160 transmits the fact that the seat Q was put in its sat state to the application client 170. In response to it, the map managing unit 176 changes an icon indicative of a seat leaving/seating state on the passage map to its seat leaving state, and updates the display on the display device 171. After completion of these operations, the fact of the completed seat-leaving processing operation is transmitted from the application client 170 to the server 160. Thereafter, the server shifts to the steady state 300. FIG. 6 is an automaton diagram showing the behavior of the entire system when the name card type node 101 having such a radio communicatable range as shown by the dotted line 210B in FIG. 2 informs the sensor network base station 110B of the fact that the node 101 belongs to the sensor network base station 110B by periodically transmitting the ID of the node 101 to the sensor network base station 110B. In the following explanation, it is assumed that the person J (240J) holds the name card type node 101J.

As the holder of the name card type node 101 moves, the base station communicatable directly with the name card type node 101 is changed. Thus the node managing section 162 is required to manage the ID of the sensor network base station 110 possibly forming the communication path with each name card type node as dynamic information. For the purpose of updating the path information, the name card type node 101 tries to periodically transmit its own ID to the sensor network base station 110. The name card type node 101J tries to periodically communicate with the sensor network base station 110. For example, when the card node succeeds in communicating lastly with the sensor network base station 110B, the card node tries to communicate with the same sensor network base station 110B. when the card node fails to communicate with the base station 110B, the card node tries to communicate with another base station. When the card node succeeds in communicating with any base station, its communication contents include the ID of the name card. In the example of this explanation, the communication is received by the sensor network base station 110B, the ID of the name card type node 101J is transmitted from the base station 110B to the sensor network processing server 160, and the server shifts to a node ID notification state 341.

Figure 10:
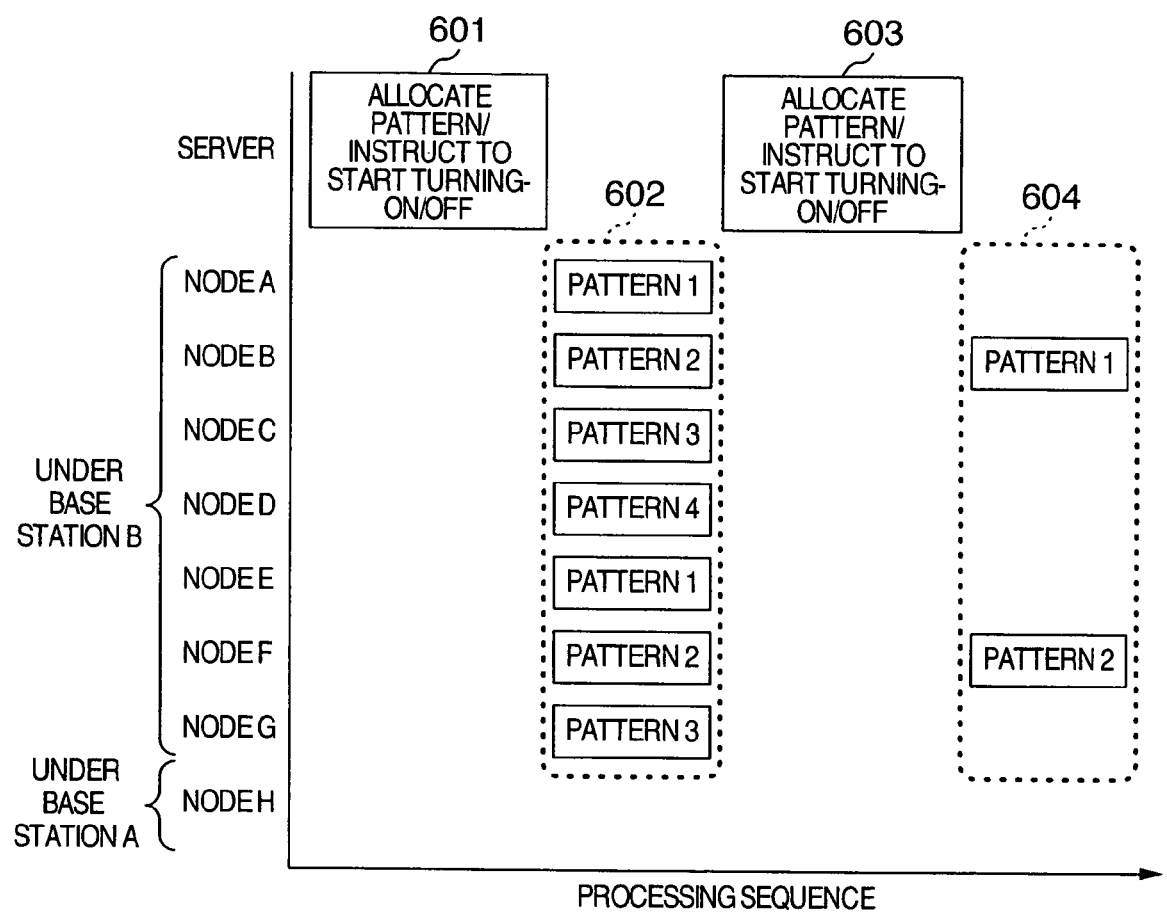
FIG. 10 is a diagram for explaining how to identify a name card type node ID in the embodiment of the present invention.

In the node ID notification state 341, the node managing section 162 generates a new ID notification record 509 on the basis of the transmitted ID and the current time, and adds the generated record in the ID notification historical list 500 in the database 161. Thereafter, the server shifts to the steady state 300. FIG. 10 shows an example of the ID notification historical list 500 stored in the database 161. The ID notification historical list 500 is a set of such ID notification records 509. A set of ID notification records 509 includes a time 501, a name card type node ID 502, and a base station ID 503. The ID notification record 509 is generated by the node managing section 162 in the node ID notification state 341 (see FIG. 6).

FIG. 7 is an automaton diagram showing processing operation periodically executed to collect the IDs of the name card type nodes 101 belonging to each base station in such an office building as shown in FIG. 2. The above processing operation is intended to refer to the ID notification record 509 recorded in the node ID notification state 341 and to detect a change of presence or absence of the direct communication between the sensor network base station 110 and the name card type node 101. By utilizing this change, a rough position of the holder of each name card type node 101, that is, a position change in the communicatable range of each base station can be detected. As a result, the fact that, for example, the card holder moved to another passage in the office building or to outside of the building can be displayed on the passage map. This is advantageous from the viewpoint of personal location management.

A timer for issuing a signal periodically or at intervals of a constant time, e.g., 10 seconds is built in the sensor network processing server 160. In response to the signal as a trigger, the server shifts to a node ID collecting state 351.

In the node ID collecting state 351, the node managing section 162 refers to the ID notification historical list 500, and identifies the sensor network base station 110 to which the name card type node 101 belongs. Similar information obtained in the previous node ID collecting state is compared with this-time information. When finding a change between the information, the server shifts to a moving-node processing state 352. When failing to find a change, the server shifts to the steady state 300.

In the moving-node processing state 352, the server 160 transmits the ID of the name card type node 101 having the above change and the ID of the corresponding sensor network base station 110 to the application client 170. In response to it, the map managing unit 176 changes an icon indicative of the position of the name card type node 101 on the passage map, and updates the display of the display device 171. After completion of the above operation, a signal indicative of completion of the moving-node processing operation is transmitted from the application client 170 to the server 160. Thereafter, the server shifts to the steady state 300.

After the processing operation of the node ID notification state 341 has been completed, the system may be shifted not to the steady state 300 but to the node ID collecting state 351. However, when all the base stations fully fails to wirelessly communicate with all the name card type nodes, that is, when all employees in the building return home; the detection of the fact cannot depend on the function of the node ID notification state 341. Thus it is desirable to employ a signal issued from the aforementioned timer or the like in combination with the above state function.

FIGS. 9A to 9D show a timing chart of turning-on/off patterns of the LED in a sensor network system in accordance with an embodiment of the present invention. In the example of FIGS. 9A to 9D, 4 types of turning-on/off patterns are defined. The turning-on/off pattern is sequentially decoded into turning-on/off patterns as shown by their numbers by analyzing an image photographed by the camera 131. Thus a time interval during which the turning on is maintained and a time interval during which the turning off is maintained are not larger than a time interval during which the camera takes a picture on a frame-by-frame basis. The turning-on/off pattern is not limited to the above two-valued form, but the pattern form may be modified to have multiple stages of different brightnesses, different light emission colors, a number of different light emission points, different shapes of the light emitting elements, or in combination therewith.

The turning-on/off pattern may be defined to be fixed to the ID of the name card type node 101. In this method, since the instruction indicative of start of LED turning-on/off transmitted from the server 160 via the base station 110 to each name card type node includes no information indicative of a turning-on/off pattern, a time necessary for transmission is short. Further, the operation of the server 160 allocating turning-on/off patterns to the respective name card type nodes 101 can be omitted.

Or the server 160 can dynamically allocate the turning-on/off pattern independently of the ID of the name card type node 101. FIG. 10 is a timing chart showing an example when the server 160 dynamically allocate a turning-on/off pattern. In this example, four types of turning-on/off patterns are previously defined, and two of the sensor network base stations 110 and 8 of the name card type nodes 101 are provided. Nodes A to G belong to a base station B, and a node H belongs to a base station A. The fact is grasped by the node managing section 162 according to the sequences of FIGS. 6 and 7. In FIG. 2, the system can communicate only with the base station B (110B) in the vicinity of the door B (201B). The server is intended to identify the name card type node 101 whose holder entered the room B through the door B. The server 160 first allocates 4 types of turning-on/off patterns to the nodes A to G belonging to the base station B, and then transmits an instruction indicative of start of turning-on/off (step 601). At this time, the server performs pattern allocation in such a manner that the patterns are allocated uniformly to the respective nodes, that is, IDs and the corresponding turning-on/off patterns are allocated to the nodes. Each name card type node 101 is turned on/off according to the allocation (step 602). When a recognized result by the camera 131 is a turning-on/off pattern 2, the name card type node 101 imaged by the camera 131 is identified as the node B or F in FIG. 10. Next, the server 160 allocates again different turning-on/off patterns only to the nodes B and F, and then transmits a turning-on/off start instruction (step 603). Turning-on/off is executed according to the aforementioned manner (step 604). If the recognized result by the camera 131 is obtained, then the eventually single name card type node 101 can be identified. According to this method, by repeating a necessary number of allocating, turning-on/off, and recognizing operations; one of the name card type nodes 101 exceeding in number the predetermined number of turning-on/off patterns can be identified as an object to be imaged.

In this method, since a decreased number of types of patterns to be previously defined is only required, a necessary time required for one-time light emission/recognizing operation can be made short. Further, the need for the nodes other than the candidate to be turned on/off can be eliminated from then on, an unnecessary power consumption involved by the LED light emission of the non-candidate nodes can be suppressed. In particular, when the number of employees in the office building, that is, the total number of name card type nodes is large, this example is advantageous over the case where the turning-on/off pattern is fixed to the ID, from the viewpoint of real time operation and power consumption. Accordingly, two methods can be suitably selected according to application conditions. In the step 601, the name card type nodes 101 for the turning-on/off patterns to be allocated are limited to 7 nodes belonging to the base station B. However, when the number of the name card type nodes 101 as candidates is made small in this way with use of information about presence or absence of radio communication with the base station, a time necessary for identifying one of the nodes through the LED turning-on/off recognition can be made short. For example, by utilizing the fact that the node cannot communicate with the base station A (110A) in the vicinity of the door B (210B), one or ones of the name card type nodes 101 belonging to the base station B (110B) and capable of communicating also with the base station A (110A) may be previously excluded to further reduce the number of the name card type nodes 101 as candidates. Further, for example, the name card type node which entered the room B but whose room leaving was not detected in the past can be also excluded.

In the foregoing explanation using FIGS. 2 and 3, the method for identifying the person who passes through the door B (201B) with use of the combination of the LED 109 of the name card type node 101 and the camera 131B having the tilt/pan/zoom function has been explained. However, a camera having a fixed attitude angle or zoom ratio may be used as the camera 131. For example, when a camera having a fisheye lens or the like mounted therein is used as the camera 131B, the entire room can be always imaged. In this case, since even the fact of the turned-on/off LED of the name card type node 101 other than the card node in the vicinity of the door B is possibly imaged by the camera 131B in the LED recognition state 302, it is impossible to identify the ID of the name card type node 101 in the vicinity of the door B only through the turning-on/off pattern analyzing operation. However, when the position of the LED in the display screen is identified in the course of image processing, the LED position in the room can be calculated. In the foregoing explanation using FIGS. 9A to 9D and FIG. 10, the method for identifying the name card type node 101 by analyzing the turning-on/off patterns of the LEDs 109 in a time series manner and identifying the number of the turning-on/off pattern, has been explained. However, the server 160 also can allocate a time range or time slot during which the Led emits light in the form of an allocating turning-on/off pattern, to each name card type node. In this case, the name card type node may be identified on the basis of a time at which the camera 131 detects the LED light emission. When this method is used, the turning-on/off operation of the name card type node in the form of a complex pattern can be omitted, and the system can also concentrate on the other processing operation during a time interval between the turned-on state and turned-off state.

Although the LED light emission has been used to identify the accurate position of the name card type node 101 in the present embodiment, a device based on another principle of capable of analyzing a signal through image processing other than the LED, for example, based on a light beam such as an infrared ray other than visible light or based on the display pattern of an LCD having no light source, may be employed.

Though the node for starting the sequence is different from the node for starting issuing the signal in response to the sequence start in the foregoing embodiment, the node for detecting a trigger of start of the sequence may be the same as the node for starting issuing a signal in response to the trigger. For example, a signal transmitting function such as the LED similar to the name card type node may be provided to a sensor node nearly fixed in position to a door. In this case, the node has a mechanism of detecting the fact that the node was mounted. When the node is mounted, the node notifies a base station of the fact of the mounted node. On the basis of the notification, the sensor network processing server 160, for example, issues a light emission instruction to a node within the base station to acquire a photographed image at a preset node installation scheduled location. Thus, the ID and position of the installed node can be automatically recorded in association with each other. When such a sequence is previously described in the sensor network processing server 160, for example, as the rule 519 indicative of processing operation at the time of the installation, the installation position upon installation of the sensor node can be identified and therefore the convenience of maintenance works after the installation can be increased.

The present invention can be applied as a monitor/authentication system at places where many and unspecified persons possibly visit including a business office, a workshop, a school, a hospital, an exhibit hall, a lecture hall, a museum, a transport facility, and a management area.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A node management system for managing sensor nodes and mobile nodes, in which each of said mobile nodes is associated with a respective predetermined light series pattern signal that identifies a respective holder of the mobile node, the node management system comprising:

a camera installed in a room in which said sensor nodes are distributed, the camera taking pictures of each of the respective holders of said mobile nodes upon the respective holder leaving or entering the room;

a sensor network base station communicating with said mobile nodes wirelessly;

a server including a node managing section and a sequence control section, said node managing section monitoring said sensor nodes and changes to a total number of mobile nodes in communication with said sensor network base station, the sequence control section controlling operation of both said node managing section and said imaging processing section according to a set of predetermined processing rules, each predetermined processing rule specifying a set of processing operations to take upon satisfaction of a corresponding set of conditions detected by said sensor nodes and recognized by said node managing section;

an image processing section processing each picture of each of the respective holders of said mobile nodes taken by said camera;

an application client displaying a passage map on a display device, the passage map including a corresponding position and a corresponding image of each of the respective holders who leave or enter the room, the corresponding image of each respective holder being extracted from the pictures of the respective holder taken by said camera upon the respective holder leaving or entering the room; and a network interconnecting said sensor nodes, said mobile nodes, said server, said image processing section, and said application client, wherein, upon recognition by said node managing section that information detected by one or more of said sensor nodes satisfies a first set of conditions corresponding to the respective holder of one of the mobile nodes leaving or entering the room, said sequence control section issues a first instruction to the image processing section to begin attempting to recognize the respective predetermined time series light pattern signal that identifies the respective holder leaving or entering the room in the pictures taken by said camera upon the respective holder leaving or entering the room and issues a second instruction to the sensor network base station to direct each of the mobile nodes in communication with the sensor network base station to begin emitting the respective predetermined time series light pattern signal that is associated with the mobile node, and, upon recognition of the respective predetermined time series light pattern signal that identifies the respective holder leaving or entering the room by said image processing section, said image processing section attempts to determine an identification (ID) of the mobile node that is associated with the respective predetermined time series light pattern signal that identifies the respective holder leaving or entering the room and, upon successfully determining the ID, outputs the ID and the image corresponding to the respective holder leaving or entering the room.

2. A node management system according to claim 1, wherein:
said image processing section is separate from said sensor nodes and said mobile nodes,
each of said mobile nodes is attached to a respective person,
said respective predetermined time series light pattern signal that is associated with each of said mobile nodes is unique to said mobile node or dynamically defined by said server; and
the first and second instructions are issued by said sequence control station at approximately simultaneously.

3. A node management system according to claim 2, wherein said sequence control section controls said camera to rotate an imaging direction of the camera according to the set of predetermined processing rules and conditions detected by said sensor nodes.

4. A node management system according to claim 3, wherein said camera is installed on a ceiling or on an upper wall in the room, and
the first set of conditions indicates detection of an opened door by a first sensor of the sensor nodes and the imaging direction of said camera is rotated by said sequence control section toward the door according to a first predetermined processing rule and the first set of conditions.

5. A node management system according to claim 4, further comprising an authority determiner for determining authority based on personal information including individual room entering authority, wherein said authority determiner determines whether or not a person associated with the ID has authority based on conditions detected by said sensor nodes, and upon determining that the person has no authority, outputs an alarm indicating a suspicious person onto a display screen.

6. A node management system according to claim 5, wherein said image processing section, upon failing to determine the ID, extracts a face image from said image corresponding to the respective holder leaving or entering the room, determines whether the respective holder is entering or leaving the room, and, upon determining that the respective holder is entering the room, outputs an indication of a presence of the respective holder onto the display screen.

7. A node management system according to claim 4, wherein said second instruction further directs said sensor network base station to allocate the respective predetermined time series light pattern signal associated with each mobile node in communication with the sensor network base station to said mobile node and said sensor node which belongs to only one base station corresponding to the door, and wherein said image processing section attempts to recognize the respective predetermined time series light pattern signal that identifies the respective holder leaving or entering the room by comparing a time series light pattern signal determined from the pictures taken by said camera upon the respective holder leaving or entering the room with said allocated respective time series light pattern signals.

8. A node management system according to claim 4, wherein:
at least one of said sensor nodes is connected to a chair in said room and transmits a detected fact of someone leaving the chart or sitting in the chair to said application client via said server;
each of said mobile nodes periodically attempts transmit a respective ID of the mobile node to the sensor network base station for transmitting to said server;
said server, upon receiving each respective ID, records an ID notification record that includes a current time, the received ID, and an identification of the sensor network base station in a historical list; and
said server periodically compares the detected fact with a previous state and transmits a detected change therebetween to said application client for updating said passage map.

9. A node management system according to claim 4, wherein said sensor network base station, upon receiving the second instruction, directs each of the mobile nodes in communication with the sensor network base station to begin emitting the respective predetermined time series light pattern signal that is associated with the mobile node except for any mobile nodes detected as having entered another room but not detected as having left the other room.

10. A computer-readable storage medium having program code embodied thereon, the program code executable by a processor to implement a method of node management, the method comprising:
acquiring images from an imaging device that is connected to a camera;
monitoring changes to a total number of mobile nodes in communication with a sensor network base station;
receiving sensed data detected by a first sensor node;
determining whether or not the received sensed data satisfies predetermined conditions;
searching for a processing sequence associated with the conditions if the sensed data satisfies the predetermined conditions;
executing the processing sequence if the sensed data satisfies the predetermined conditions, the processing sequence including:
issuing a first instruction to each mobile node in communication with said sensor network base station to begin emitting a respective predetermined time series light pattern signal that is associated with the mobile node and identifies a respective holder of the mobile node;
recognizing a first predetermined time series light pattern signal in the acquired images that is associated with a first mobile node in communication with the sensor network base station;
attempting to determine an identification (ID) of the first mobile node based on the first predetermined time series light pattern signal;
outputting the ID if the ID is determined and a first image of the images acquired from the imaging device corresponding to the respective holder of the first mobile node to use in outputting an alert on the basis of the first predetermined time series light pattern signal; and displaying a passage map on a display device that shows a position and a face image of the respective holder of the first mobile device, the face image being extracted from the first image.

11. A node management program according to claim 10, wherein said processing sequence further includes issuing a second instruction to set an imaging direction of the camera based on the sensed data prior to acquisition of the first image from the imaging device.

12. A node management program according to claim 10, wherein said processing sequence further includes analyzing the first image from said imaging device and extracting the face image therefrom.

13. An entering/leaving management system comprising:

a camera installed in a room, the camera taking pictures of persons leaving or entering a room;

a plurality of name card type nodes each being carried by a respective person and each including a solar battery, a radio communication circuit and an LED emitting a predetermined on-off time-series light pattern signal that is uniquely associated with the name card type node and identifies the respective person carrying the name card type node, wherein each time interval during which the LED of each name card node is maintained in an on state or an off state according to the predetermined on-off time-series light pattern signal that is uniquely associated with the name card type node is not longer than a time interval between pictures taken by the camera;

at least one sensor node detecting information related to persons entering or leaving the room;

a sensor network base station communicating with said plurality of name card type nodes and the at least one sensor node wirelessly;

an image processing section processing each picture taken by said camera;

a server including a node managing section and a sequence control section, said node managing section monitoring said at least one sensor node and changes to a total number of name card type nodes in communication with said sensor network base station, the sequence control section controlling operation of both said node managing section and said imaging processing section according to a set of predetermined processing rules, each predetermined processing rule specifying a set of processing operations to take upon satisfaction of a corresponding set of conditions detected by said at least one sensor node and recognized by said node managing section;

an application client displaying a passage map on a display device, the passage map including a corresponding position and a corresponding image of each person who leaves or enters the room, the corresponding image of each person who leaves or enters the room being extracted from the pictures taken by said camera; and a network interconnecting said at least one sensor node, said plurality of name card type nodes, said camera, said server, said image processing section and said application client;

wherein, upon recognition by said node managing section that information detected by said at least one sensor node satisfies a first set of conditions, said sequence control section issues a first instruction to the sensor network base station to direct each of the plurality of name card type nodes in communication with the sensor network base station to begin emitting the predetermined on-off time-series light pattern signal that is uniquely associated with the name card type node, and then said image processing section acquires the pictures taken by the camera, recognizes the predetermined on-off time-series light pattern signal that is uniquely associated with a first name card type node being emitted by the first name card type node in the pictures acquired from the camera, attempts to determine an identification (ID) of the first name card type node according to the predetermined on-off time-series light pattern signal that is uniquely associated with a first name card type node, and outputs the ID if the image processing section determines the ID and a position of the first name card type node.

14. An entering/leaving management system according to claim 13, wherein said image processing section, upon failing to determine the ID, extracts a face image in said pictures acquired from the camera, determines whether someone is entering or leaving the room, and, upon determining that someone is entering the room, outputs an indication of a presence of the respective holder onto a display screen.

* * * * *